United States Patent
Xavier da Silveira

(10) Patent No.: US 10,755,135 B2
(45) Date of Patent: Aug. 25, 2020

(54) COMPUTATIONAL IMAGING DEVICE AND METHOD FOR IMPROVED CORNER DETECTION

(71) Applicant: Paulo Eduardo Xavier da Silveira, Boulder, CO (US)

(72) Inventor: Paulo Eduardo Xavier da Silveira, Boulder, CO (US)

( * ) Notice: Subject to any disclaimer, the term of this patent is extended or adjusted under 35 U.S.C. 154(b) by 192 days.

(21) Appl. No.: 16/139,076

(22) Filed: Sep. 23, 2018

(65) Prior Publication Data

US 2020/0097751 A1   Mar. 26, 2020

(51) Int. Cl.
| | | |
|---|---|---|
| G06K 9/46 | (2006.01) | |
| G06K 9/20 | (2006.01) | |
| G06K 9/74 | (2006.01) | |
| G06T 7/13 | (2017.01) | |

(52) U.S. Cl.
CPC .......... *G06K 9/4609* (2013.01); *G06K 9/209* (2013.01); *G06K 9/74* (2013.01); *G06T 7/13* (2017.01); *G06T 2207/20164* (2013.01)

(58) Field of Classification Search
CPC ...... G06K 9/4609; G06K 9/4604; G06K 9/74; G06K 9/741; G06K 9/743; G06K 9/745; G06K 9/76; G06K 9/209; G06T 7/13; G06T 2207/20164
See application file for complete search history.

(56) References Cited

U.S. PATENT DOCUMENTS

| | | | | |
|---|---|---|---|---|
| 5,692,072 A * | 11/1997 | Hashimoto | ............... | G06T 7/12 382/199 |
| 7,944,467 B2 * | 5/2011 | Silveira | ............. | G06K 9/00604 348/78 |
| 8,144,208 B2 * | 3/2012 | Silveira | ................. | G02B 26/06 348/222.1 |
| 8,558,182 B2 * | 10/2013 | Chi | ...................... | H04N 5/2254 250/336.1 |
| 8,570,655 B2 * | 10/2013 | Ben-Eliezer | ....... | G02B 27/0075 359/559 |
| 8,594,447 B2 * | 11/2013 | Smith | ..................... | G06T 5/003 382/199 |
| 8,687,040 B2 * | 4/2014 | Silveira | ............. | G02B 27/0075 348/36 |
| 8,760,516 B2 * | 6/2014 | Silveira | ............. | G06K 9/00604 348/153 |
| 8,929,662 B2 * | 1/2015 | Park | .................. | H04N 5/23267 382/199 |
| 9,294,690 B1 * | 3/2016 | Caulfield | ............. | H04N 5/2173 |
| 9,652,833 B2 * | 5/2017 | McCloskey | ............ | G06T 5/003 |
| 9,990,738 B2 * | 6/2018 | Whiteford | ............... | G06T 7/557 |
| 10,404,908 B2 * | 9/2019 | Stork | ................ | G02B 27/4205 |
| 2013/0011051 A1 * | 1/2013 | Bottisti | .................. | G06K 9/522 382/159 |
| 2018/0173982 A1 * | 6/2018 | Zink | .................. | G06K 9/00973 |
| 2020/0027214 A1 * | 1/2020 | Jain | ........................... | G06T 7/13 |
| 2020/0034623 A1 * | 1/2020 | Suzuki | ................ | G06K 9/4604 |

FOREIGN PATENT DOCUMENTS

JP         2008082748 A  *  4/2008

* cited by examiner

*Primary Examiner* — John Villecco

(57) ABSTRACT

A computational imaging device and method are described, wherein the computational imaging device is operable to perform corner detection and other computer vision tasks more efficiently and/or more robustly than traditional imaging devices. In addition, methods are described operable to jointly optimize the computational imaging device and the corner detection task.

16 Claims, 13 Drawing Sheets

COMPUTATIONAL IMAGING DEVICE AND METHOD FOR IMPROVED CORNER DETECTION

CROSS-REFERENCE TO RELATED APPLICATION

This application claims priority to U.S. Provisional Patent Application No. 62/689,030, which was filed in the U.S. Patent and Trademark Office on Jun. 22, 2018, all of which is incorporated herein by reference in its entirety for all purposes.

FIELD

The present disclosure pertains to computational imaging systems and devices and methods optimized for computer vision applications.

BACKGROUND

The present disclosure relates generally to computational imaging systems—that is, imaging systems designed with the main goal to capture images used for computational tasks rather than to capture visually pleasing images. More specifically, this disclosure describes systems and methods capable of capturing images that can be robustly used for corner detection.

Corner detection is the first task required for many computer vision tasks, such as image recognition, localization, SLAM (simultaneous localization and mapping) and tracking. SLAM, in particular, finds applications in robotics, navigation systems, autonomous vehicles—including terrestrial, aerial, marine, submersed and spatial navigation, to name a few. It also finds applications in augmented reality, virtual reality and other applications that require the mapping of an environment.

The computer vision literature usually assumes operation using images captured using traditional imaging systems, so much that the pinhole camera assumption is ubiquitous. This assumption ignores the benefits of increased operational robustness and design flexibility provided by computational imaging devices such as the ones described in the present disclosure.

BRIEF DESCRIPTION OF THE DRAWINGS

The foregoing summary, as well as the following detailed description, will be better understood when read in conjunction with the appended drawings. For the purpose of illustration, there is shown in the drawings certain examples of the present disclosure. It should be understood, however, that the present inventive concept is not limited to the precise examples and features shown. The accompanying drawings, which are incorporated in and constitute a part of this specification, illustrate an implementation of apparatuses consistent with the present inventive concept and, together with the description, serve to explain advantages and principles consistent with the present inventive concept.

DETAILED DESCRIPTION

Figure 1:
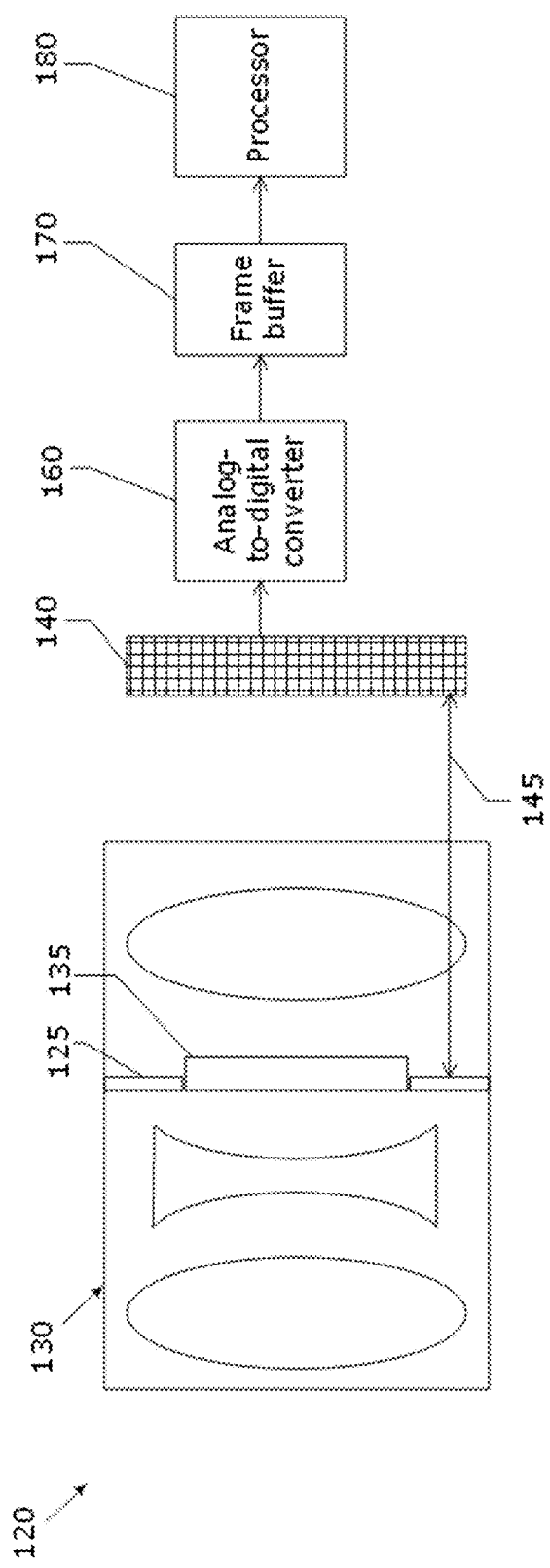
FIG. 1 illustrates an example of a computational imaging device according to the present disclosure.

Several definitions that apply throughout this disclosure will now be presented. The term "comprising" means "including, but not necessarily limited to"; it specifically indicates open-ended inclusion or membership in a so-described combination, group, series and the like. "About" refers to almost, nearly, on the verge of, or without significant deviation from the numeric representation. For example, about 20 can be 20, or a small deviation from 20. "Coupled" refers to the linking or connection of two objects. The coupling can be direct or indirect. An indirect coupling includes connecting two objects through one or more intermediary objects. Coupling can also refer to electrical or mechanical connections. Coupling can also include linking without physical contact.

The present disclosure endeavors to solve a variety of problems in the industry. The present disclosure includes the ability to detect corners in images. The present disclosure additionally includes the ability to optimize imaging systems so they are better at the corner detection task. The present disclosure also allows the improvement of other tasks that depend on corner detection, such as localization, image recognition, SLAM and tracking, to name a few.

The present disclosure includes a system and device for detecting corners using a combination of computational imaging and computer vision techniques. Even though corners are used as an example the invention can be easily expanded to include edges, local peaks and other key image features.

The present disclosure can be implemented in one or more of the devices and/or systems described herein. In one example, the present disclosure includes a computational imaging device with an engineered pupil function. Examples of computational imaging devices include systems that include an imaging lens, a sensor, an Analog-to-Digital Converter (ADC) and a processor. The lens forms an image in the sensor, the sensor converts detected photons into an electric charge which the ADC converts into a digital value. The resulting digitized image is then processed by the processor in order to render a modified image or otherwise to extract useful information from the image. The lens does not need to be a traditional lens, designed to render a diffraction-limited image. It simply needs to conserve information of interest for later processing.

The engineered pupil function may consist of a phase mask designed to modulate the phase of wavefronts propagating through the lens in order to perform a specific computational imaging task. Examples of phase masks include a diffractive optical element, a computer-generated hologram (CGH), a refractive aspheric element and their combinations. One example of a phase mask consists of a cubic phase mask used, for example, to increase the depth of field of a computational imaging system. Another example of a computational imaging system is one that uses a high-order separable pupil function to extend the operational range of an iris recognition biometric system. Such computational imaging systems find applications in task-based imaging system.

In at least one example, the computational imaging device is operable to capture a digital image that is capable of improved corner detection. In other examples, the computational imaging system is operable to perform localization and/or SLAM. In other examples, the computational imaging device is operable to capture 3D images used in virtual reality and augmented reality applications. In yet other examples, the computational imaging device is operable to perform navigation, wherein navigation includes and is not limited to autonomous vehicles, drones, robots, aerial vehicles, etc.

FIG. 1 illustrates an example of a computational imaging device 120 according to the present disclosure. The computational imaging device 120 can include a specialized lens 130 operable to form a specialized image in photodetector array 140. The specialized lens 130 differs from a traditional lens in such that instead of having a flat or nearly-flat pupil function, it presents a pupil function that is engineered to present a specialized modulation. The modulation may be in intensity and/or phase, but is preferably phase-only in order to maximize the light capture ability of the lens and, hence, the signal-to-noise ratio of its resulting image.

The pupil function modulation is achieved, for example, by modifying a traditional lens so that its aperture stop 125 contains and/or is coupled to a specialized element 135 capable of modulating the phase and/or intensity of light. In one example the specialized element 135 consists of a refractive optical element, such as an injection molded plastic—for example, polymethyl methacrylate (PMMA)—or a diamond-turned material—for example, calcium fluoride ($CaF_2$) or Germanium (Ge). In another example the specialized element 135 consists of a computer generated hologram (CGH) fabricated using, for example, photolithographic processing methods. In yet another example the specialized element 135 consists of a diffractive grating. Even though FIG. 1 shows specialized element 135 used in transmissive mode, it could also be used in reflective mode. That is, light could be modulated upon reflection by specialized element 135 instead of during transmission through specialized element 135.

Photodetector array 140 contains at least one photodetector capable of converting impingent photons into an electric signal. Examples of electrical signals include a photocurrent, a voltage signal or an electric charge. Photodetector array 140 can be, for example, a complementary metal oxide semiconductor (CMOS) imaging array, a charge coupled device, one or more PIN photodetectors, a self-electrooptic effect device (SEED) array. It may also be, for example, an infrared photodetector such as a quantum well photodetector, a bolometer array, a thermoelectric focal plane array. It could also be one or more photomultiplier tube, avalanche photodiode or a multi-pixel photon counter.

The electric signal from photodetector array 140 is converted into a digital signal by the analog-to-digital converter 160. The analog-to-digital converter 160 may consist of a single, a pair or multiple analog-to-digital converters. In one example, the analog-to-digital converter 160 is integrated in the same integrated circuit (IC) as photodetector array 140. In another example the analog-to-digital converter 160 is implemented by a discrete component external to the photodetector array 140.

The analog-to-digital converter 160 stores one or more digitized images in frame buffer 170. Frame buffer 170 may comprise a random access memory (RAM), a static RAM, a flash RAM, a dynamic RAM. Frame buffer 170 may also comprise external memory, or storage in an external device, such as cloud storage.

Frame buffer 170 stores the digitized image for later processing by processor 180. Processor 180 executes instructions to perform corner detection, among other tasks. In one example the processor 180 may comprise a central processing unit (CPU), a microprocessor, a field-programmable gate array (FGPA), a microcontroller, a graphic processing unit (GPU). Processor 180 may also comprise an external processor, CPU, FGPA, GPU, cloud processor, back-end processor or an external server. The processor 180 may filter the digitized image before performing corner detection.

Figure 2:
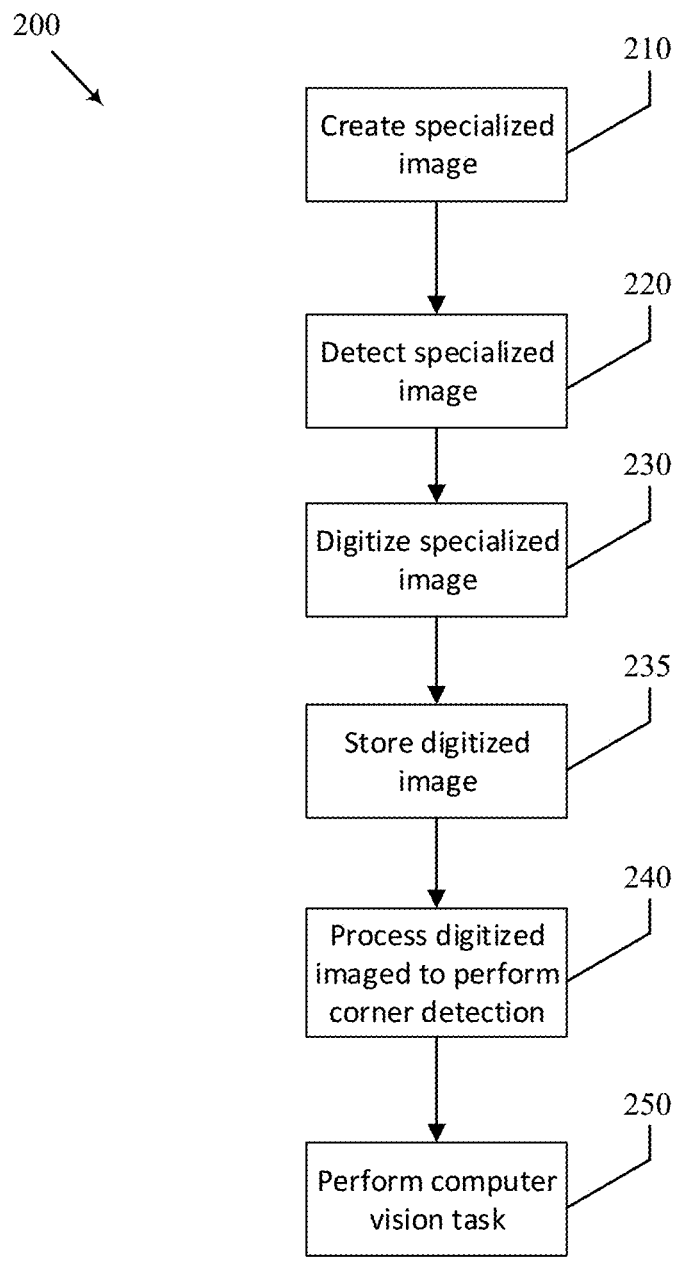
FIG. 2 is a block flow diagram of an exemplary method operable to capture a specialized image and process it to perform a computer vision task according to the present disclosure.

FIG. 2 illustrates exemplary method 200 operable to capture a specialized image and process it to perform a computer vision task. The method 200 starts with step 210, the creation of a specialized image, a task performed by the computational imaging device 120. Step 210 is followed by step 220, the detection of the specialized image by photodetector array 140. Next the detected image is digitized in step 230, a task that is performed by the analog-to-digital converter 160. Then, the resulting digital image is stored by frame buffer 170, as described by step 235. After storage, the digital image is processed to perform corner detection, a task performed by processor 180 in step 240. In one example the corner detector processor 180 may filter the digitized image before corner detection using a filter designed to enhance edges and high spatial frequencies, preferably while suppressing noise. In another example the corner detector processor 180 executes corner detection directly without filtering the digitized image, resulting in faster processing times and lower power consumption. The corner detector processor 180 may use, for example, the FAST algorithm. In another example, the corner detector processor 180 may use the Harris corner detection method. In yet another example, the corner detector processor 180 may use the Shi-Tomasi corner detection method.

Corner detection is an important initial step in several computer vision applications, including localization, mapping, 3D mapping and navigation. Hence, the processing and corner detection step 240 is followed by the computer vision task 250. As such, the method 200 may be applicable to robots, drones, terrestrial, maritime, submerged and/or aerial autonomous vehicles. Method 200 is also applicable to the 3D mapping tasks required for augmented reality and virtual reality applications. For example, the mapping of a room in which a user operates to prevent him/her from colliding against walls and furniture in a virtual reality application, or the mapping of a room to enable the addition of virtual elements, objects or characters in an augmented reality application. In addition, method 200 also finds application in computer aided design (CAD), architecture and applications that benefit from the mapping and 3D rendering of objects, buildings, structures and/or environments.

Figure 3A:
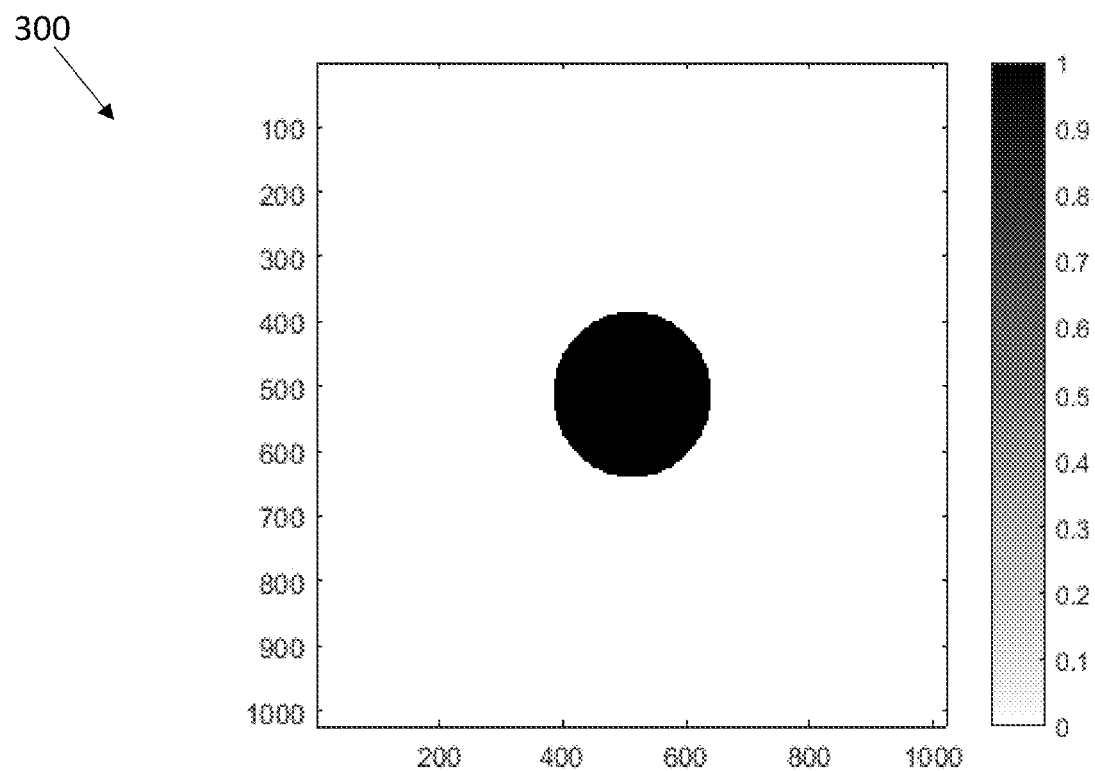
FIG. 3A illustrates an example of the amplitude of a high-order separable pupil function according to the present disclosure.

FIG. 3A illustrates an example 300 of the amplitude of a specialized pupil function according to the present disclosure. The amplitude is simply a circular aperture in this example, with a diameter matching that of the aperture stop 125 of the specialized lens 130, thus maximizing its light collection ability, resulting in the highest possible signal-to-noise ratio in the detected image.

Figure 3B:
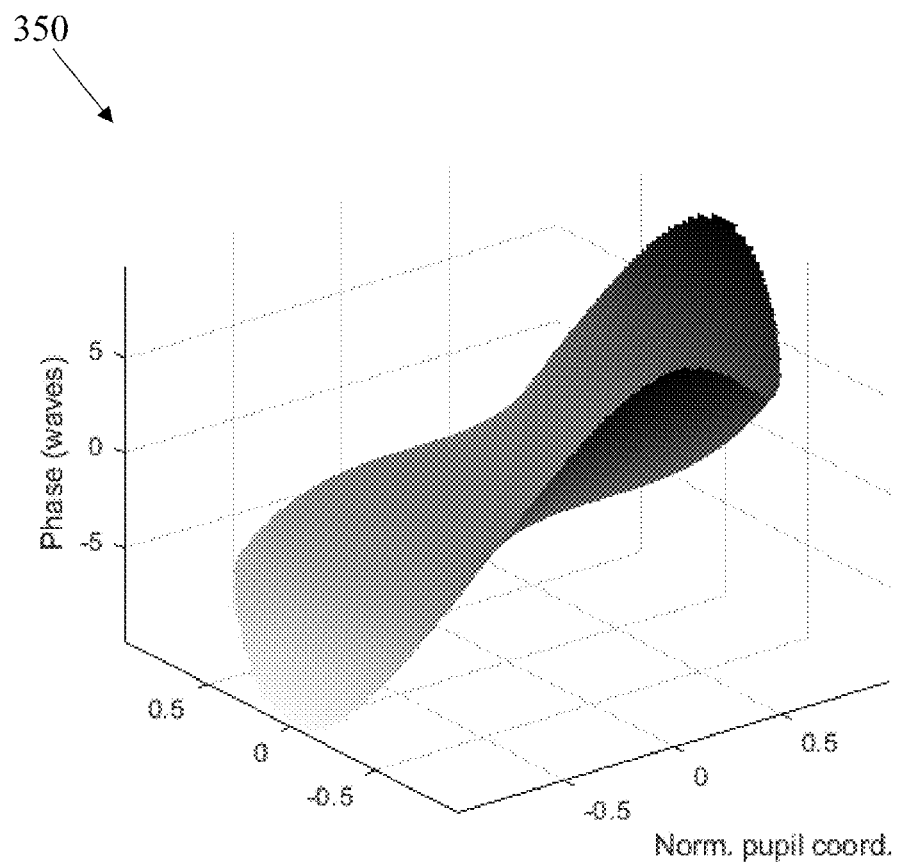
FIG. 3B illustrates an example of the phase of a high-order separable pupil function according to the present disclosure.

FIG. 3B illustrates an example 350 of the phase of a high-order separable pupil function according to the present disclosure. A high-order separable function, according to this disclosure, is an analytic function mathematically expressible as $$p(u_x, u_y) = A(u_x, u_y) \cdot \exp[-2\pi i \Sigma_j^N \alpha_j (u_x^{2j+1} + u_y^{2j+1})], \quad \text{Eq. 1}$$

Where $u_x$ and $u_y$ are the normalized pupil coordinates in the horizontal and vertical directions, respectively, $A(u_x, u_y)$ is the amplitude of the pupil function, preferably selected with a constant unity amplitude matching the shape of the aperture stop in order to maximize the light transmission through the specialized lens 130. $i = \sqrt{-1}$, N is the highest order polynomial used to represent the pupil phase, and $\alpha_j$ is the phase deviation associated with the jth polynomial. High-order separable pupil functions present the advantage of concentrating the modulation of its imaging lens within the horizontal and vertical axes, making it especially advantageous for edge and corner detection. In addition, high order separable functions, as all separable functions, can be filtered using only two vector-matrix multiplications, as opposed to the matrix-matrix multiplication required to filter more generic, non-separable functions. This advantage results in reduced computational cost, reduced processing time and increased power savings without sacrificing accuracy.

In one example, the pupil function in a specialized lens 130 with circular aperture stop may be given by the following special case of Eq. 1:

$$p = \text{circ}(u_x, u_y) \cdot \exp[-2\pi i \alpha (u_x^3 + u_x^5 + u_y^3 + u_y^5)], \quad \text{Eq. 2}$$

where circ(.) is the circular function, such as the example 300 depicted in FIG. 3A. In one example $\alpha=20$, such as example 350 depicted in FIG. 3B. In another example $\alpha=30$. In another example $\alpha=60$. In addition, the phase of the pupil function may be simply given by a separable cubic function, mathematically expressible as $$p = \text{circ}(u_x, u_y) \cdot \exp[-2\pi i \alpha (u_x^3 + u_y^3)]. \quad \text{Eq. 3}$$

This second expression renders somewhat reduced performance but the resulting surface is simpler to fabricate. Also, given the earlier application of this pupil function for extending the depth of field of imaging systems, specialized elements implementing the cubic phase are more readily available.

Figure 4A:
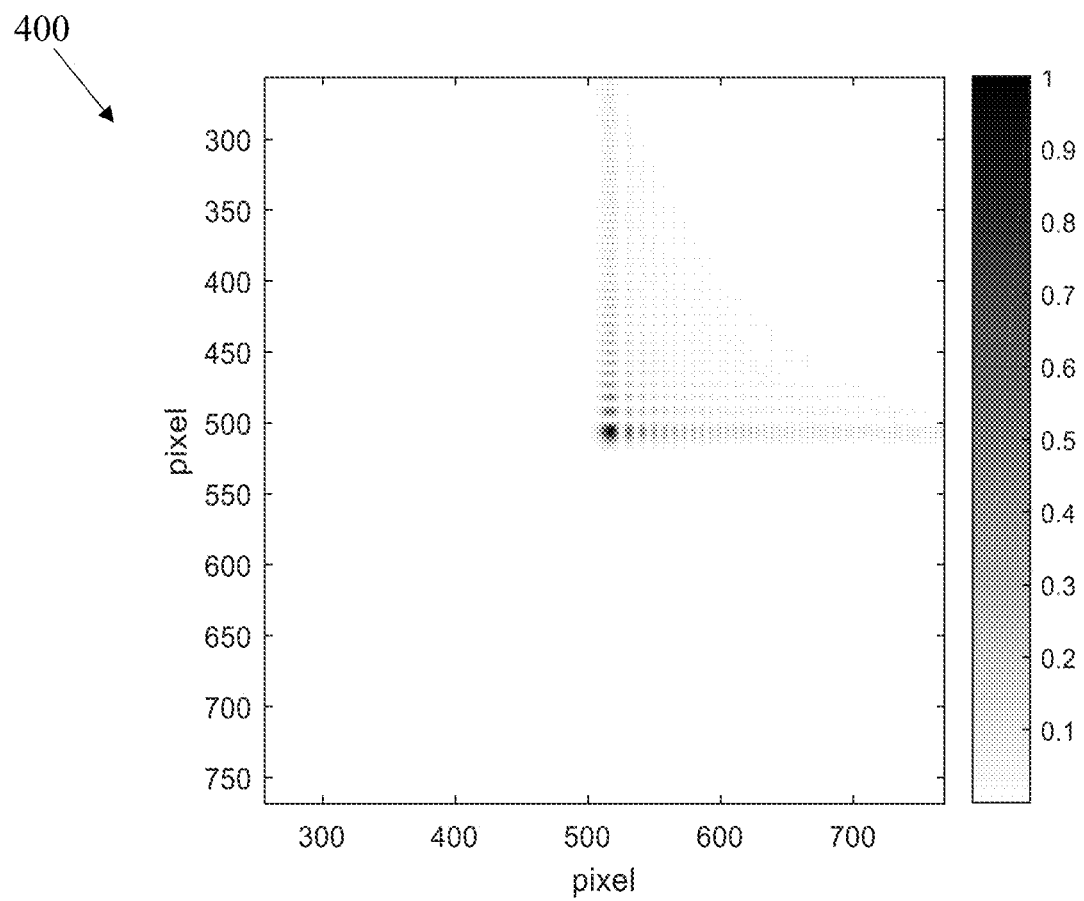
FIG. 4A illustrates an example of a specialized point spread function according to the present disclosure.

FIG. 4A illustrates an example 400 of a specialized point spread function according to the present disclosure. In this example, the phase of the pupil function is represented by Eq. 2 with $\alpha=20$. This is the pattern that would be produced by a plane wave coming from a single direction after propagation through the specialized lens 130 and before detection by photodetector array 140. In this example the point spread function was numerically simulated in a computer using a lens focal length of 10 mm, an entrance pupil diameter of 3 mm, a numeric aperture of 0.15, a center wavelength of 500 nm, a sensor resolution of 1024×1024 with an overfill factor of 4. That is, 4 times as many pixels were used in the simulation, by zero-padding, as are present in the simulated computational imaging device. Simulating the point spread function is an important step in simulating the specialized images obtained by a given computational imaging device. The system parameters were selected in order to match those of a low-cost imaging system, such as a secondary camera found in a smartphone. However, different parameters could be selected, matching almost any imaging system, providing different simulation results but similar conclusions regarding the benefits provided by the computational imaging device described in this disclosure.

Figure 4B:
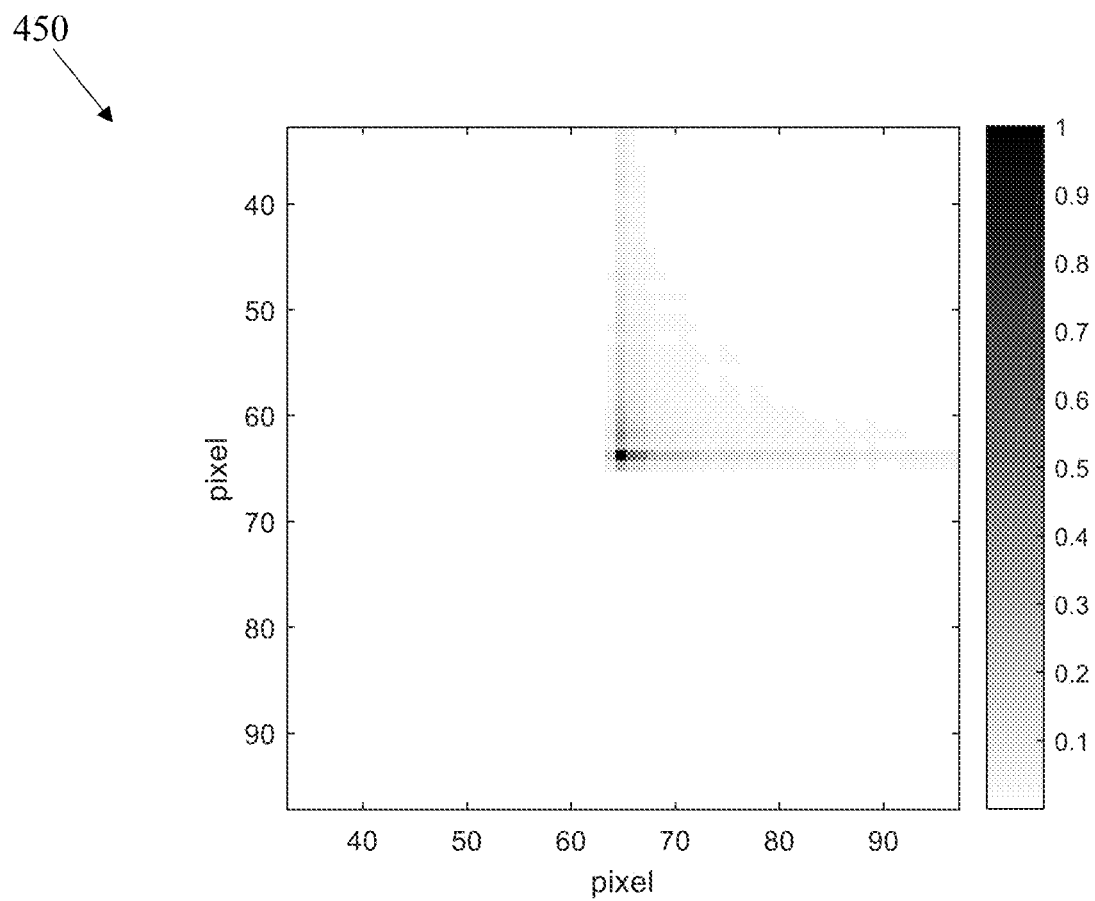
FIG. 4B illustrates an example of a specialized point spread function, after detection, according to the present disclosure.

FIG. 4B illustrates an example 450 of a specialized point spread function, after detection by the photodetector array 140. Because of the finite dimensions and spacing of the pixels present in the photodetector array 140, detection results in low-pass spatial filtering and aliasing of the point spread function, both effects have been taken into account in FIG. 4B using a pixel spacing of 3.33 µm and a 100% fill factor. These effects result in the smearing of the finest features in the point spread function seen in FIG. 4A. Nevertheless, as will be shown later, these effects did not compromise the performance of the specialized imaging system.

Figure 5:
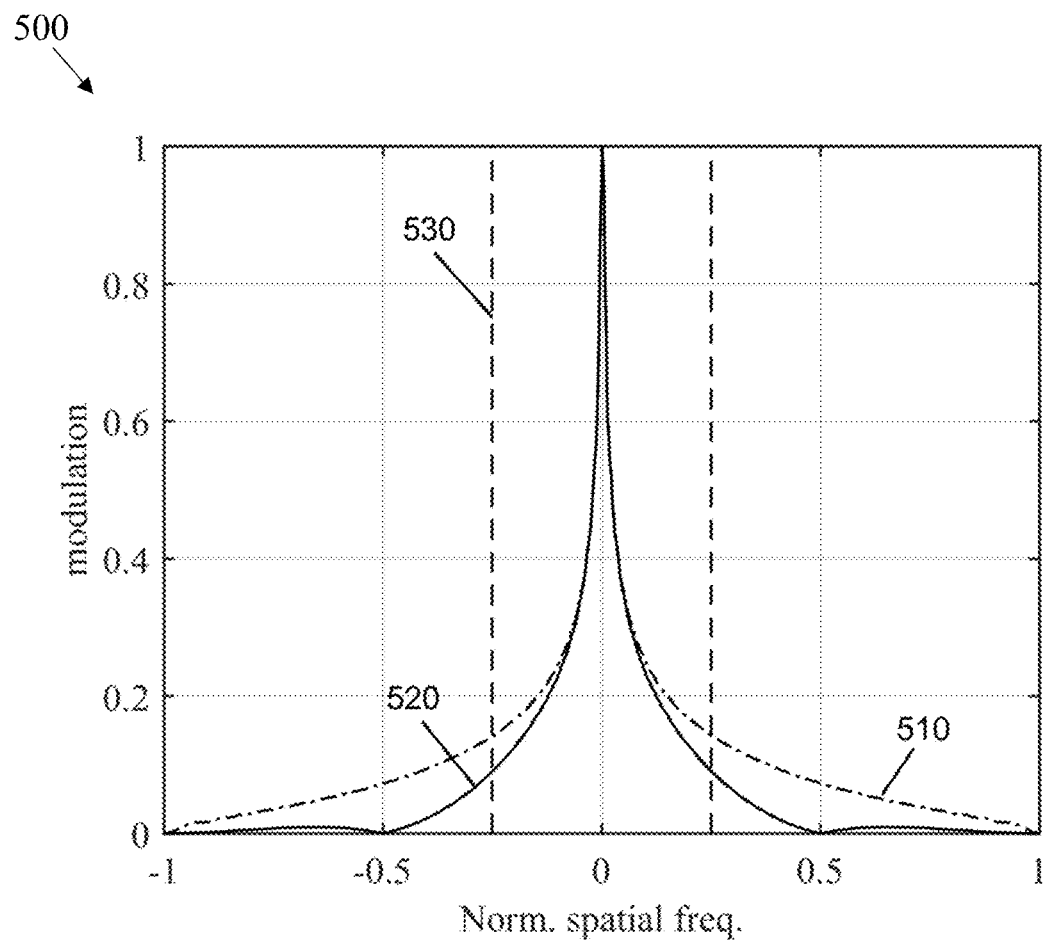
FIG. 5 illustrates an example of a specialized modulation transfer function according to the present disclosure.

FIG. 5 illustrates an example 500 of a specialized modulation transfer function (MTF) according to the present disclosure. The MTF conveys what fraction of signal at a given spatial frequency is transmitted by a given imaging system, in this case a simulated version of computational imaging device 120. 510 (dash-dotted line) represents the modulation of the specialized lens 130 before detection by photodetector array 140. 520 (solid line) represents the modulation of the resulting image after detection by the photodetector array 140. 530 (dashed lines) represent the highest spatial frequency that can be correctly sampled by the simulated photodetector array before aliasing occurs. That is, frequency components present in the image at spatial frequencies higher than those represented by the dashed lines are aliased back into lower frequencies. In general, aliasing is detrimental to the performance of most imaging systems but it is simulated here for completeness and to demonstrate that the computational imaging device 120 performs well nevertheless.

Figure 6:
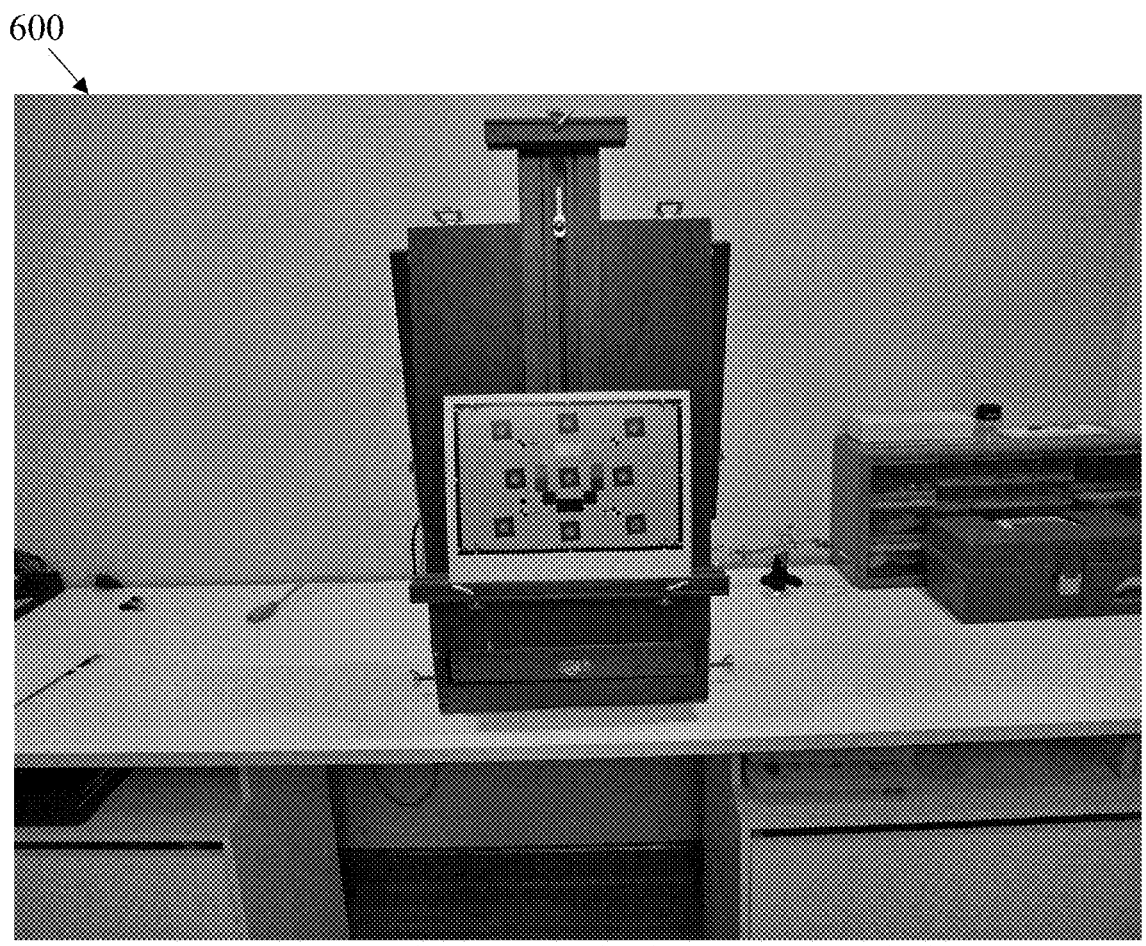
FIG. 6 illustrates an example of a high-resolution image used to exemplify the operation of a computational imaging device according to the present disclosure.

FIG. 6 illustrates an example 600 of a high-resolution image used to exemplify the operation of a computational imaging device according to the present disclosure. The image was captured with a mechanically stabilized high-resolution camera using low ISO number and long exposure to maximize its signal-to-noise ratio. The exposure was selected to almost fill in the full-well count of the photodetector array of the camera, but not so high as to prevent saturation. This image was used as a representation of the input object in subsequent simulations.

Figure 7A:
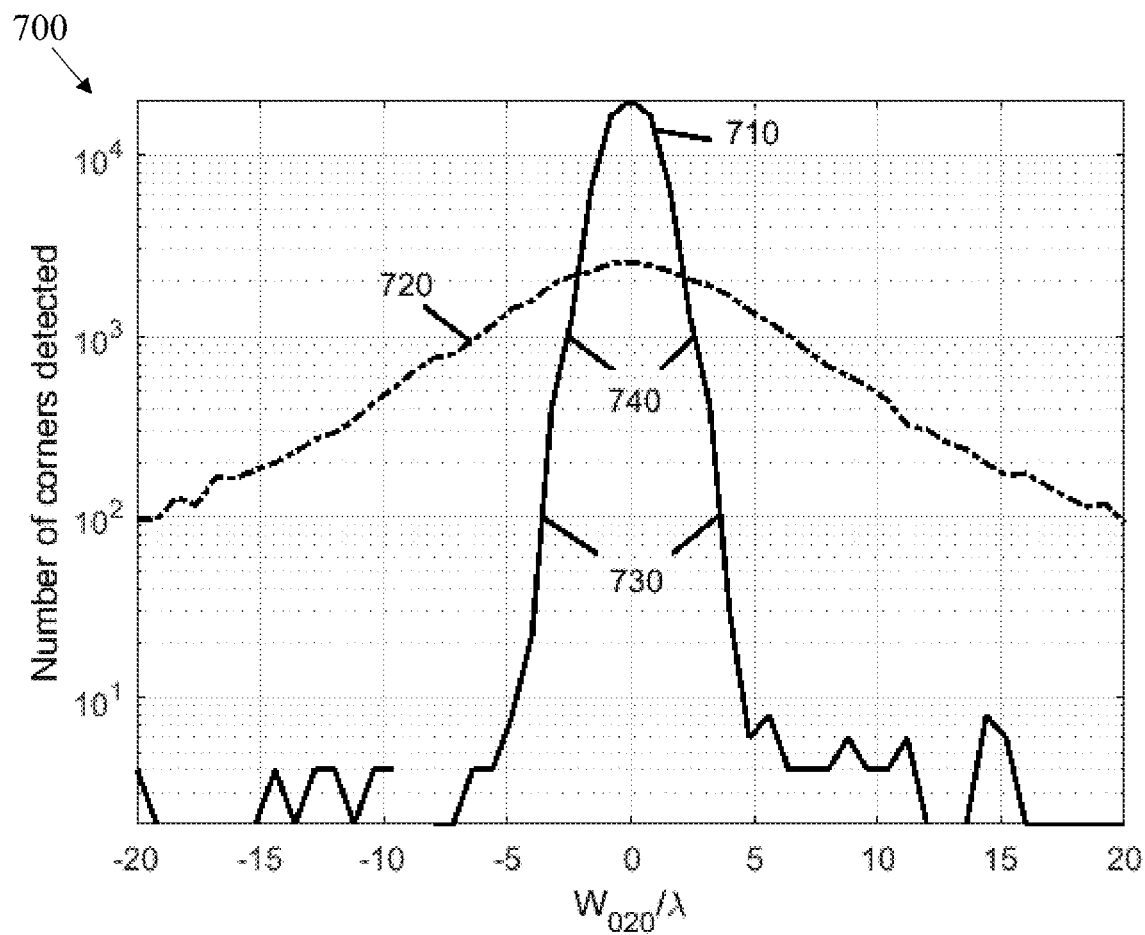
FIG. 7A illustrates an example of the number of corners detected as a function of defocus without non-maximal suppression, according to the present disclosure.

FIG. 7A illustrates an example 700 of the number of corners detected as a function of distance using a simulated computational imaging device according to the present disclosure. A realistic simulation has to include noise, which was done in this case by adding shot noise with a Poisson distribution while limiting the full well count of photodetector array 140 to 20,000 electrons and its quantum efficiency to 50%. Read noise was also taken into account using a Maxwellian distribution with 7 electrons root-mean-squared. These parameters are, once again, comparable to those found in low-cost secondary smartphone cameras. In addition, quantization noise was also taken into account by attributing a bit depth of 10 bits to the analog-to-digital converter 160.

In addition, defocus was also taken into account by placing the simulated scene at a nominal distance of 2 m (best focus) and then simulating the quadratic wavefront resulting from moving the computational imaging system 130 (or the object) away from best focus. Line 710 of FIG. 7A shows that the resulting defocus affects a traditional imaging device (solid line) much more significantly than the engineered computational imaging device 120, as shown by line 720 (dashed line). Computational imaging tasks rely on corner detection to determine keypoints that are used from frame to frame. These keypoints serve as references for image recognition, tracking, navigation and mapping tasks, for example. As such, a minimum number of keypoints is required to guarantee proper execution of the desired computer vision task. An excess number of points, on the other hand, is not required and may in fact be detrimental since processing a large number of keypoints is computationally expensive. In an example, a minimum number of 100 keypoints is required. In another example, a minimum number of 50 points is required. In yet another example, a minimum number of 20 points is required, and in yet another example, a minimum number of 10 points is required.

Defocus is simulated by adding a quadratic wavefront to the pupil phase, wherein the quadratic wavefront is expressible by the following mathematical formula $$W_{020}/\lambda = D/(8\lambda)(1/d_0 + 1/d_i - 1/f),\quad\text{Eq. 4}$$

where $W_{020}/\lambda$ is the defocus aberration expressed in waves, D is the entrance pupil diameter of the specialized lens 130, $\lambda$ is the center wavelength of light captured by the specialized lens 130, $d_o$ is the distance from the specialized lens 130 and the object, or scene, being imaged, and $d_i$ is the distance 145 from the lens exit pupil to the photodetector array 140.

Example 700 in FIG. 7A illustrates an example of nine-point corner detection using the FAST algorithm, without using non-maximal suppression, resulting in a larger number of keypoints, many of each in close proximity to each other. This results in a large number of corners detected at best focus ($|W_{020}/\lambda|=0$), especially in the traditional imaging system. Using a minimum number of required keypoints of, for example, 100, we see that both the traditional and the engineered computational imaging device far surpass the minimum required number of points at best focus. However, as the device (or the object) move away from the best focus position, the number of points detected by either device drops below their maxima but the drop is significantly faster for the traditional device, to the effect that it drops below the minimum required number of keypoints at about 4 waves of defocus ($|W_{020}/\lambda|=4$, points 730) while the computational imaging device is capable of detecting a larger number of corners with a defocus as small as 2 waves of defocus ($|W_{020}/\lambda|=2$, points 740). More notably, the computational imaging device is capable of maintaining the minimum number of detected corners even when defocus reaches ±20 waves, resulting in an about 5 times increase in the depth of field over which the computational imaging device 120 can operate in comparison to a traditional imaging device.

Figure 7B:
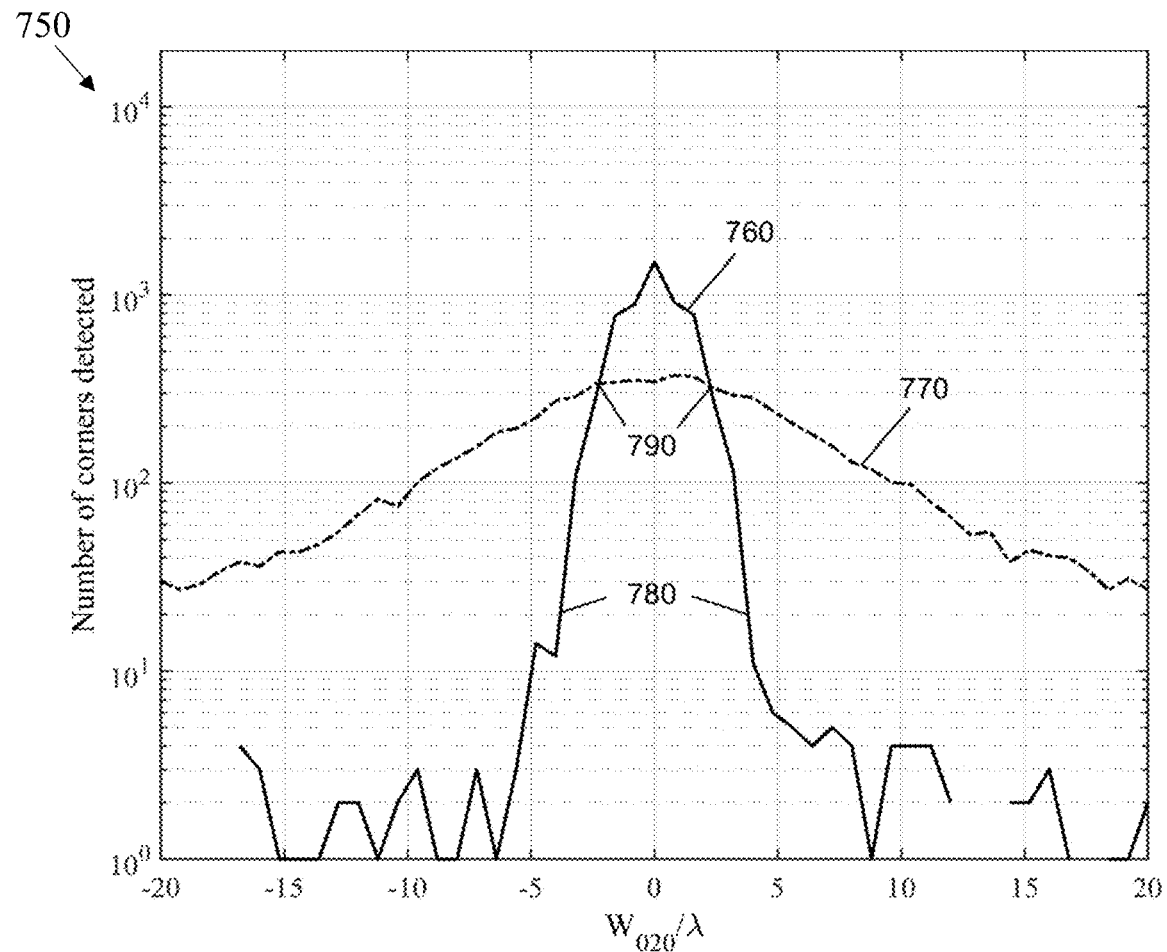
FIG. 7B illustrates an example of the number of corners detected as a function of defocus with non-maximal suppression, according to the present disclosure.

FIG. 7B illustrates an example 750 of nine-point corner detection using the FAST algorithm, this time using non-maximal suppression, resulting in a relatively smaller number of keypoints in comparison to the example 700 shown in FIG. 7A. Maximal suppression removes several corners that are in close proximity to each other, resulting in fewer but more significant keypoints since they correspond to more distinct corners. Although we have fewer points for both the traditional (line 760) and the computational imaging device 120 (line 770), the main conclusions remain similar: we still have a peak in the number of corners detected at best focus ($|W_{020}/\lambda|<0$). Now, since the resulting corners are more significant, we are comfortable operating at a lower minimum keypoint requirement of, for example, 20 keypoints. Then we see that the traditional device again drops below the minimum required number of keypoints at about 4 waves of defocus ($|W_{020}/\lambda|=4$, points 780) while the computational imaging device is capable of detecting a larger number of corners with a defocus as small as 2.5 waves of defocus ($|W_{020}/\lambda|32\ 2.5$, points 790). More notably, the computational imaging device is capable of maintaining the minimum number of detected corners even when defocus reaches ±20 waves, resulting in an increase in the depth of field over which the computational imaging device 120 can operate of at least 5 times compared to the operational depth of field of a traditional imaging device.

Figure 8:
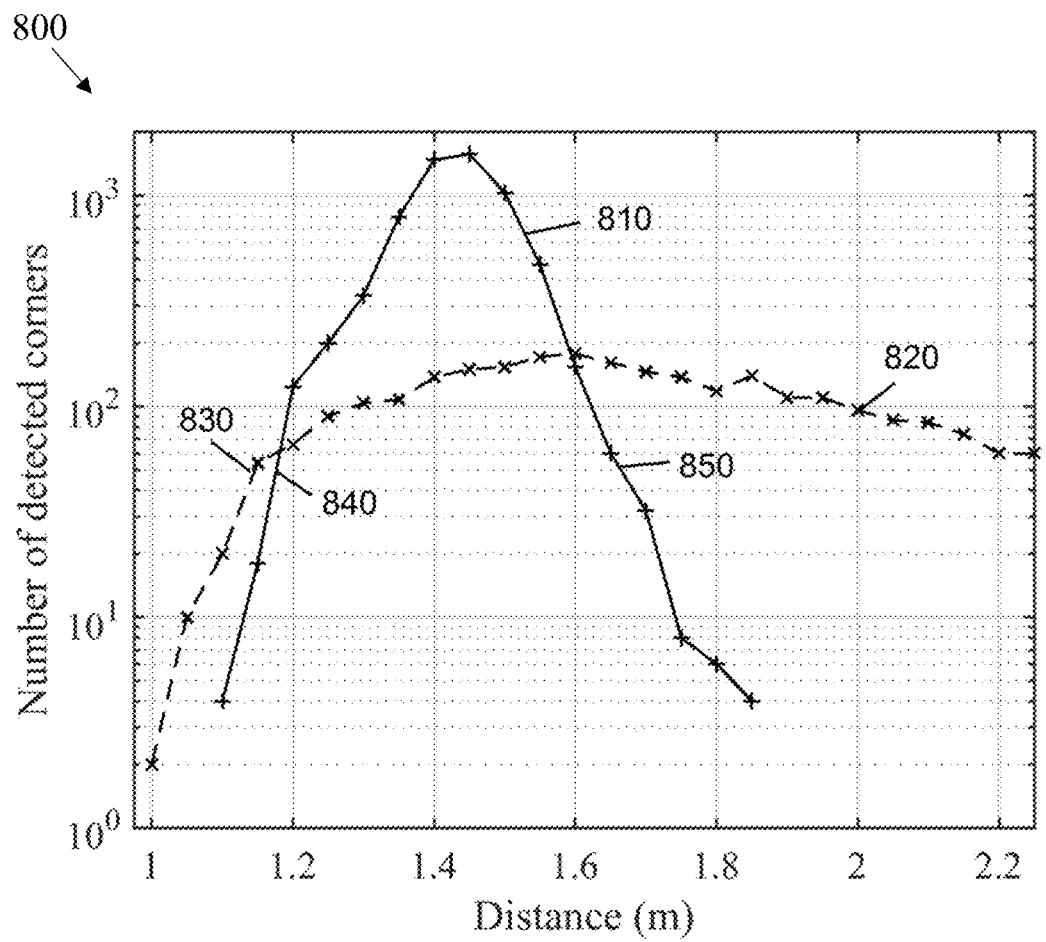
FIG. 8 illustrates a practical example of the number of corners detected as a function of distance using a traditional and a computational imaging device according to the present disclosure.

FIG. 8 illustrates a practical example 800 of the number of corners detected as a function of distance using a traditional and a computational imaging device according to the present disclosure. The example was implemented by modifying an f=50 mm, F/2.8 Cosmicar closed-circuit television (CCTV) lens by coupling a specialized element 125 to its aperture stop, thus implementing specialized lens 130. A second lens was also employed without modifications, resulting in two imaging devices: a traditional one and a computational imaging device such as device 120. In both cases the photodetector array 140, analog-to-digital converter 150 and frame buffer 170 were implemented by a Panasonic DMC-GX7 camera body and processing was performed in a separate laptop running the MATLAB computer language to execute the FAST corner detection algorithm with nonmaximal suppression.

Both imaging devices were focused (i.e., $d_i$ was adjusted) to obtain best-focus at an object distance, $d_o=1.4$ m. Also, both imaging devices were moved with respect to the object so that $d_o$ was allowed to range from 1 m to 2.25 m in 0.05 m increments. At each object distance a new image was captured using both imaging devices and corners were detected using the FAST algorithm. In particular, the computational imaging system 120 was processed using the method 200.

The solid line in FIG. 8 (810) shows the interconnected points (crosses) representing the number of corners detected at each object distance using the traditional device while the dashed line (820) shows the interconnected points (x's) representing the number of corners detected at each object distance using the computational imaging device 120. Using a minimum number of keypoints of 50 we see that the traditional device was capable to detect the minimum number of corners from 1.19 m (point 830) to 1.65 m (point 840) while the computational imaging device was capable of detecting the minimum number of corners from 1.15 m (point 850) to at least 2.25 m, resulting in an increase in operational depth of field of at least 2.4 times.

When $d_o$ is sufficiently large $W_{020}$ converges to the value $D(f-d_i)/(8fd_i)$ and stays relatively constant even when $d_o$ increases further. In other words, by focusing the specialized imaging system at a given hyperfocal distance (for example, 1.4 m) it is possible to achieve sufficiently suitable performance (i.e., detect the minimum required number of keypoints) all the way from infinity down to a minimum operational distance (for example, 1.15 m, as given by point 850). This ability to increase the operational range over which computer vision tasks can function is especially useful during autonomous navigation. For example, an aerial drone during landing will arrive from a large distance and needs to keep continuous navigational operation during the critical moments of final approach. A traditional imaging system would have to sacrifice performance either by moving the hyperforcal distance farther away, thus losing ability to operate in close proximity, or by increasing its depth of field by reducing its aperture stop (increasing its F-number). This would result in a darker image, the reduction in detected photons being directly proportional to the reduced area of the aperture stop. To compensate for that loss the traditional imaging system could increase the exposure time, but that would result in additional motion blur, another problem for autonomous vehicles. Alternatively, the traditional imaging system could implement auto-focus at the cost of increased system complexity, size, weight and power consumption. Thus, the use of a specialized imaging device 120 proves substantially more robust and favorable in autonomous navigation scenarios.

Figure 9:
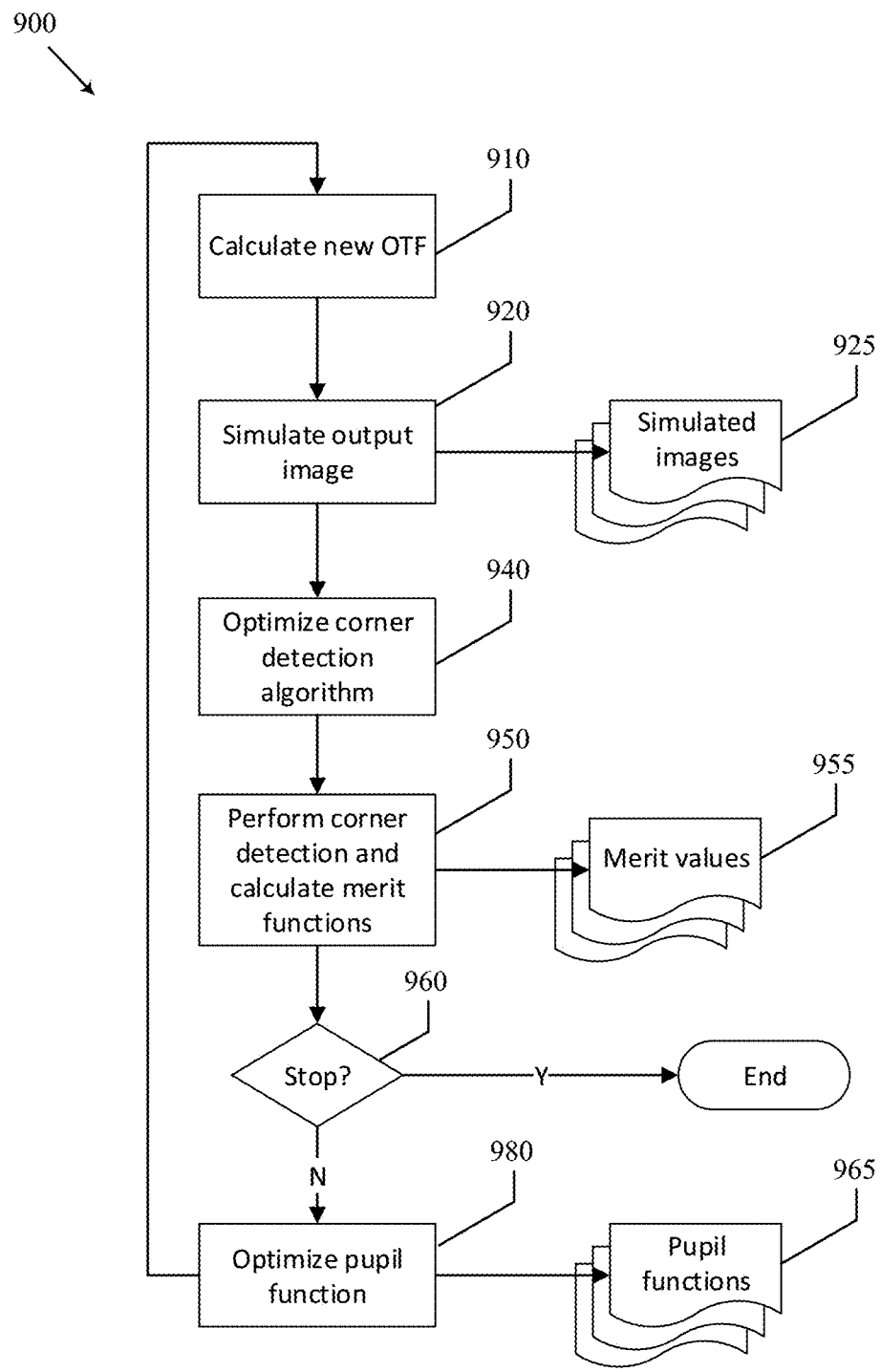
FIG. 9 is a block flow diagram of an exemplary method operable to jointly optimize a specialized imaging device and a corner detection algorithm according to the present disclosure.

FIG. 9 is a block flow diagram of an exemplary method 900 operable to jointly optimize a specialized imaging device and a corner detection algorithm. The method operates in a loop and, hence, can be started at any block within the loop. For example, starting at block 910 the optical transfer function (OTF) is calculated using, for example, the following mathematical expression $$OTF = \int\int p\left(u_x - \frac{x}{2}, u_y - \frac{y}{2}\right) p^*\left(u_x + \frac{x}{2}, u_y + \frac{y}{2}\right) dxdy. \quad \text{Eq. 5}$$

That is, the OTF is given by the two-dimensional spatial auto-correlation of the pupil function, where x and y are the spatial dimensions spanning the support of the pupil function. The PSF is then simply given by the Fourier transform of the OTF, of which PSF 400 is an example. Given the PSF, then and any object or scene imaged by a computational imaging device 120 can be simulated, as performed by step 920. The simulation can be performed, for example, by convolving the PSF of the specialized lens 130 with a high-resolution, high signal-to-noise ratio input image, such as image 600, for example. In addition, the MTF is given by the modulus of the OTF, of which the MTF 500 is an example.

Additionally, the imaging performed by a computational imaging device 120 can be simulated, for example, by first Fourier transforming the input high-resolution, high signal-to-noise ratio image 600 and then multiplying that result by the OTF of Eq. 5 and then performing the inverse Fourier transform of the resulting product. The simulation is performed for one or more variations of the pupil function, for one or more input object or scene.

After executing step 920 one or more times, the result is the generation of one or more simulated images 925. These images are then used in step 940 to optimize the corner detection algorithm—for example, the FAST algorithm. The standard form of the FAST algorithm is optimized for the corner detection task using machine learning algorithms and a collection of traditional images as input. That is, using images captured using traditional imaging systems. As such, FAST has the opportunity to perform better when used in combination with a computational imaging device 120 when optimized using a collection of images captured (or simulated) using substantially the same computational imaging device. The result is that after step 940 we have a corner detection algorithm that performs progressively better given the current iteration of the pupil function and its possible variations.

In step 950 corner detection is performed in the stack of one or more simulated images 925 and merit functions are calculated for each image in the stack, resulting in merit values 955. The merit functions can be comprised, for example, of the number of corners detected in each image. Additionally, the merit functions could be comprised of the number of corners detected in a given region or set of regions in the simulated images.

In step 980 the merit values 955 calculated in step 950 are used to guide the optimization of the pupil function. The optimization can be performed, for example, using a gradient ascent algorithm to adjust the parameters $\alpha_j$ in Eq. 2 in order to maximize the merit functions calculated in step 950. The output of step 980 could be, for example, a new set of pupil functions 965 candidates for simulation, which are then used by step 910, closing the optimization loop.

The optimization loop may stop, for example, once the pupil functions converge to a substantially approximate value given, for example, by the root-mean squared value of their differences being below a certain threshold. Other stopping criteria are possible, such as reaching a sufficiently high merit function value for a given merit function in a given simulated image, by observing the convergence of the merit function over consecutive iteration steps, or by selecting a maximum number of iterations. The decision whether to stop or continue the optimization loop is effected in step 960.

Figure 10:
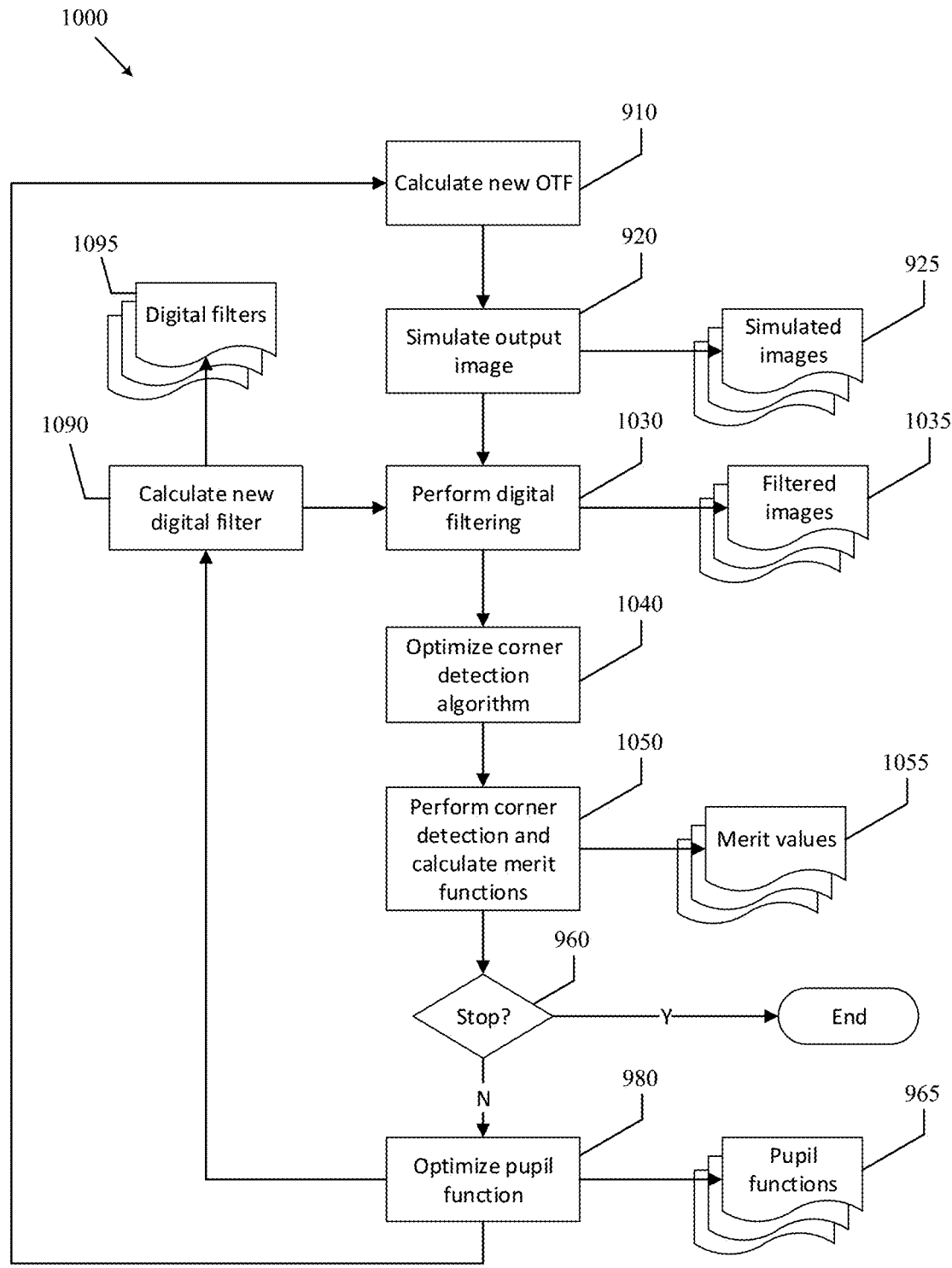
FIG. 10 is a block flow diagram of an additional exemplary method operable to jointly optimize a specialized imaging device and a corner detection algorithm according to the present disclosure.

Computational imaging devices sometimes benefit from the digital filtering of their digitized images before performing a computer vision task. The digital filter presents the opportunity for further optimization, such as that presented in method 1000 depicted by the block flow diagram in FIG. 10. Method 1000 is an additional exemplary method operable to jointly optimize a specialized imaging device, a corner detection algorithm and a digital filter according to the present disclosure.

The method operates in a loop and, hence, can be started at any block within the loop. For example, starting at block 910 the OTF is calculated using, for example, the same mathematical expression shown in Eq. 5, and the same methods described in step 910 of method 900. Step 920 simulates the output image. The simulation can be performed, for example, by convolving the PSF of the specialized lens 130 with a high-resolution, high signal-to-noise ratio input image, such as image 600, for example. The simulation is performed for one or more variations of the pupil function, for one or more input objects or scenes, the result being the generation of one or more simulated images 925. These images are then filtered, for example, by being convolved with one or more digital filters in step 1030, resulting in a stack of one or more filtered images 1035. Because each simulated image may be filtered by one or more digital filters, filtered image stack 1035 may contain more images than simulated image stack 925.

Step 1040 uses the filtered images 1035 to optimize the corner detection algorithm—for example, the FAST algorithm, the result being that after step 1040 we have a corner detection algorithm that is expected to perform better given the current iteration of the pupil function, the digital filter, and their possible variations.

In step 1050 corner detection is performed in the stack of one or more filtered images 1035 and/or simulated images 925. Merit functions are calculated for each image in the stack, resulting in merit values 1055. The merit functions can be comprised, for example, of the number of corners detected in each image. Additionally, the merit functions could be comprised of the number of corners detected in a given region or set of regions in the simulated images.

In step 980 the merit values 1055 calculated in step 1050 are used to guide the optimization of the pupil function. The optimization can be performed, for example, using a gradient ascent algorithm to adjust the parameters $\alpha_j$ in Eq. 2 in order to maximize the merit functions calculated in step 1050. The output of step 980 could be, for example, a new set of pupil functions 965 candidates for simulation, which are then used by step 910.

In step 1090 one or more digital filters 1095 are calculated. This calculation can be either performed using another optimization loop using the merit values 1055 as the optimization driving function, or using a filter design algorithm based on the OTF or MTF of the specialized lens and/or noise characteristics of the underlying imaging system. One example of such filter design algorithm is that used to design Wiener filters.

The optimization loop may stop, for example, once the pupil functions converge to a substantially approximate value given, for example, by the root-mean squared value of their differences being below a certain threshold. Other stopping criteria are possible, such as reaching a sufficiently high merit function value for a given merit function in a given simulated image, by observing the convergence of the merit function over consecutive iteration steps, or by selecting a maximum number of iterations. The decision whether to stop or continue the optimization loop is effected in step 960.

The description above includes example systems, methods, techniques, instruction sequences, and/or computer program products that embody techniques of the present disclosure. However, it is understood that the described disclosure can be practiced without these specific details.

It is believed that the present disclosure and many of its attendant advantages will be understood by the foregoing description, and it will be apparent that various changes can be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various examples, it will be understood that these examples are illustrative and that the scope of the disclosure is not limited to them. Many variations, modifications, additions, and improvements are possible. More generally, examples in accordance with the present disclosure have been described in the context of particular implementations. Functionality can be separated or combined differently in various examples of the disclosure or described with different terminology. These and other variations, modifications, additions, and improvements can fall within the scope of the disclosure as defined in the claims that follow.

What is claimed is:

1. A computational imaging device comprising:
    a specialized lens for modulating the phase and/or intensity of incoming light;
    at least one photodetector to detect a specialized image;
    at least one analog-to-digital converter operable to digitize the photons detected by the at least one photodetector;
    at least one frame buffer;
    a processor operable to perform corner detection using the digitized, specialized image generated by the analog-to-digital converter.

2. The computational imaging device of claim 1, wherein the specialized lens is implemented by coupling a specialized element to its aperture stop.

3. The computational imaging device of claim 2, wherein the specialized element is implemented by at least one of a refractive optical element, a diffractive optical element, a computer generated hologram.

4. The computational imaging device of claim 2, wherein the specialized element provides the computational imaging device with a high-order separable pupil function.

5. The high-order separable pupil function of claim 4, where the pupil function is of the form $p=\text{circ}(u_x, u_y) \cdot \exp[-2\pi i \alpha (u_x^3 + u_x^5 + u_y^3 + u_y^5)]$.

6. A method for implementing corner detection in a computational image device, the method comprising:
    creating a specialized image using a lens coupled with a specialized element for modulating the phase and/or intensity of incoming light;
    detecting the specialized image using at least one photodetector
    digitizing the specialized image using an analog-to-digital converter
    storing the digitized, specialized image in a frame buffer
    processing the digitized, specialized image using a corner detection algorithm.

7. The method of 6, wherein corner detection is performed using the FAST algorithm.

8. The method of 7, wherein a minimum number of 10 corners are detected per image.

9. The method of 6, wherein the digitized image is digitally filtered before processing it for corner detection.

10. The method of claim 6, wherein corner detection is performed to execute at least one computational vision task, including localization, image recognition, tracking, SLAM, navigation or 3D mapping.

11. The method of claim 10, wherein the computer vision tasks are applicable to at least one of a robot, drone or autonomous vehicle.

12. The method of claim 11, wherein the computer vision task consists of navigation by an autonomous aerial vehicle during landing and/or take off.

13. The method of claim 10, wherein the computer vision task consists of the mapping of a room in which a user operates to prevent the user from colliding against walls and furniture in a virtual reality application.

14. The method of claim 10, wherein the computer vision task consists of the mapping of a room in which a user operates to enable the addition of virtual elements, objects and/or characters in an augmented reality application.

15. A method for optimizing a corner detection computational imaging system, the method comprising
    calculating a new OTF
    simulating at least one output image
    optimizing at least one corner detection algorithm using at least one simulated output image performing corner detection and calculating merit function values calculating at least one pupil function by optimizing at least one pupil function parameters of a computational imaging system based on calculated merit function values.

16. The method of claim 15 further comprising filtering at least one of the at least one simulated images using at least one digital filter optimizing at least one corner detection algorithm using the at least one filtered image calculating new digital filters based on the at least one optimized pupil functions.

* * * * *